(12) United States Patent
Heinz et al.

(10) Patent No.: US 9,251,123 B2
(45) Date of Patent: Feb. 2, 2016

(54) SYSTEMS AND METHODS FOR CONVERTING A PDF FILE

(75) Inventors: Christopher J. Heinz, Lexington, KY (US); Joshua M. Moore, Lexington, KY (US); James M. Downs, Lexington, KY (US)

(73) Assignee: Hewlett-Packard Development Company, L.P., Houston, TX (US)

(*) Notice: Subject to any disclaimer, the term of this patent is extended or adjusted under 35 U.S.C. 154(b) by 667 days.

(21) Appl. No.: 12/955,358

(22) Filed: Nov. 29, 2010

(65) Prior Publication Data

US 2012/0137207 A1    May 31, 2012

(51) Int. Cl.
*G06F 17/30* (2006.01)
*G06F 17/21* (2006.01)
*G06F 17/27* (2006.01)
*G06T 11/60* (2006.01)

(52) U.S. Cl.
CPC .......... *G06F 17/211* (2013.01); *G06F 17/2705* (2013.01); *G06T 11/60* (2013.01)

(58) Field of Classification Search
CPC .................................................. G06F 17/2705
USPC .................... 715/249, 230, 234, 221; 382/100
See application file for complete search history.

(56) References Cited

U.S. PATENT DOCUMENTS

| | | | | |
|---|---|---|---|---|
| 6,336,124 B1* | 1/2002 | Alam et al. | | 715/205 |
| 7,281,005 B2* | 10/2007 | Canright | | G06F 17/30864 |
| 7,423,659 B1* | 9/2008 | Pratley et al. | | 345/660 |
| 7,493,320 B2* | 2/2009 | Canright | | G06F 17/30864 |
| 7,602,972 B1* | 10/2009 | Wei | | G06F 17/245 358/453 |
| 7,676,741 B2* | 3/2010 | McGatha | | G06F 17/2247 715/205 |
| 7,698,637 B2* | 4/2010 | Burago | | G06F 17/217 715/243 |
| 7,721,198 B2* | 5/2010 | McGatha | | G06F 17/27 715/241 |
| 7,739,587 B2* | 6/2010 | Vion-Dury | | G06K 9/00449 715/217 |
| 7,818,304 B2* | 10/2010 | Vasey | | G06F 17/2247 707/694 |
| 7,852,499 B2* | 12/2010 | Dejean | | G06F 17/2745 358/1.13 |
| 7,908,284 B1* | 3/2011 | Mathes | | G06F 17/30882 707/755 |
| 7,913,163 B1* | 3/2011 | Zunger | | 715/243 |
| 7,937,338 B2* | 5/2011 | Boguraev | | G06F 17/218 706/12 |
| 7,979,785 B1* | 7/2011 | Wang | | G06F 17/30905 715/200 |
| 7,991,709 B2* | 8/2011 | Dejean | | G06F 17/211 706/12 |
| 8,023,740 B2* | 9/2011 | Dejean | | G06K 9/2054 382/181 |
| 8,144,360 B2* | 3/2012 | Buckley | | G06F 17/243 358/1.15 |
| 8,145,654 B2* | 3/2012 | Miller | | G06F 17/30017 707/757 |
| 8,311,331 B2* | 11/2012 | Nijemcevic | | G06K 9/00463 382/176 |
| 8,380,753 B2* | 2/2013 | Mansfield | | G06F 17/2241 707/791 |
| 8,433,723 B2* | 4/2013 | Smith | | G06F 19/705 702/30 |
| 8,443,278 B2* | 5/2013 | Mansfield | | G06F 17/211 715/227 |
| 8,509,563 B2* | 8/2013 | Robinson | | G06F 17/2765 358/474 |
| 8,543,911 B2* | 9/2013 | Mansfield | | G06F 17/212 715/243 |

(Continued)

OTHER PUBLICATIONS

Chao, Hui; Fan, Jian, Layout and Content Extraction for PDF Documents, 2004—conf. date Sep. 2004, Springer Berlin Heidelberg, Document Analysis Systems VI, Lecture Notes in Computer Science, Series vol. 3163, pp. 213-224.*

(Continued)

*Primary Examiner* — Mohammed-Ibrahim Zuberi

(74) *Attorney, Agent, or Firm* — Tarolli, Sundheim, Covell & Tummino L.L.P.

(57) ABSTRACT

A method can comprise parsing a PDF file to collect a plurality of primitive objects. The method can also comprise iteratively joining a subset of the plurality of primitive objects to form editable design objects for a corresponding design file.

15 Claims, 4 Drawing Sheets

(56) References Cited

U.S. PATENT DOCUMENTS

| | | | | |
|---|---|---|---|---|
| 8,782,516 | B1* | 7/2014 | Dozier | G06F 17/218 715/236 |
| 8,782,551 | B1* | 7/2014 | Bartelma | G06F 17/211 715/776 |
| 8,832,549 | B2* | 9/2014 | Mansfield | G06F 17/211 382/173 |
| 8,837,818 | B2* | 9/2014 | Komaki | G06F 17/211 382/159 |
| 8,854,361 | B1* | 10/2014 | Smith | G06F 19/12 345/419 |
| 8,881,002 | B2* | 11/2014 | Veselov | G06F 17/212 715/243 |
| 8,949,711 | B2* | 2/2015 | Veselov | G06F 17/211 715/234 |
| 8,977,955 | B2* | 3/2015 | Veselov | G06F 17/211 715/234 |
| 9,047,533 | B2* | 6/2015 | Bart | G06K 9/00449 |
| 9,069,855 | B2* | 6/2015 | Zunger | G06F 17/30864 |
| 9,135,249 | B2* | 9/2015 | Dejean | G06F 17/2745 |
| 9,152,632 | B2* | 10/2015 | Smith | G06F 17/30011 |
| 2002/0078100 | A1 | 6/2002 | Tewari | |
| 2002/0111963 | A1 | 8/2002 | Gebert et al. | |
| 2003/0167271 | A1 | 9/2003 | Arnold et al. | |
| 2004/0006742 | A1* | 1/2004 | Slocombe | G06F 17/2205 715/234 |
| 2004/0093355 | A1* | 5/2004 | Stinger | 707/104.1 |
| 2004/0181746 | A1 | 9/2004 | McLure et al. | |
| 2004/0205616 | A1 | 10/2004 | Rosenberg et al. | |
| 2005/0125728 | A1 | 6/2005 | Peiro et al. | |
| 2005/0193327 | A1* | 9/2005 | Chao et al. | 715/513 |
| 2006/0005126 | A1* | 1/2006 | Shapiro | 715/522 |
| 2006/0294460 | A1* | 12/2006 | Chao et al. | 715/520 |
| 2007/0112763 | A1 | 5/2007 | Broder et al. | |
| 2007/0136427 | A1* | 6/2007 | Zellner et al. | 709/206 |
| 2010/0040287 | A1* | 2/2010 | Jain et al. | 382/177 |
| 2010/0174732 | A1* | 7/2010 | Levy et al. | 707/768 |
| 2010/0251092 | A1* | 9/2010 | Sun | 715/222 |
| 2011/0222773 | A1* | 9/2011 | Radakovic et al. | 382/182 |
| 2011/0258535 | A1* | 10/2011 | Adler et al. | 715/235 |

OTHER PUBLICATIONS

Chao Hui, et al., "Layout and Content Extraction for PDF Documents", Journal—Document Analysis Systems VI; Series Title: Lecture Notes in Computer Science, Volume and Issue No. 3163, Sep. 8-10, 2004; pp. 213-224.

"Importing Designs Into HP Exstream", Hewlett-Packard Development Company, L.P., Jul. 29, 2010, pp. 1-72.

* cited by examiner

SYSTEMS AND METHODS FOR CONVERTING A PDF FILE

BACKGROUND

Portable Document Format (PDF) is an open standard for document exchange. The file format can be used for representing two-dimensional documents in a manner independent of the application software, hardware, and operating system. Each PDF file encapsulates a complete description of a fixed-layout 2D document that includes the text, fonts, images, and 2D vector graphics which compose the documents. In some examples, three-dimensional drawings can be embedded in PDF documents. PDF files can be comprised of objects such as Boolean values, numbers, text strings, etc. Objects of a PDF file can be either direct (embedded in another object) or indirect. Indirect objects can be numbered with an object number and a generation number.

DETAILED DESCRIPTION

Figure 1A:
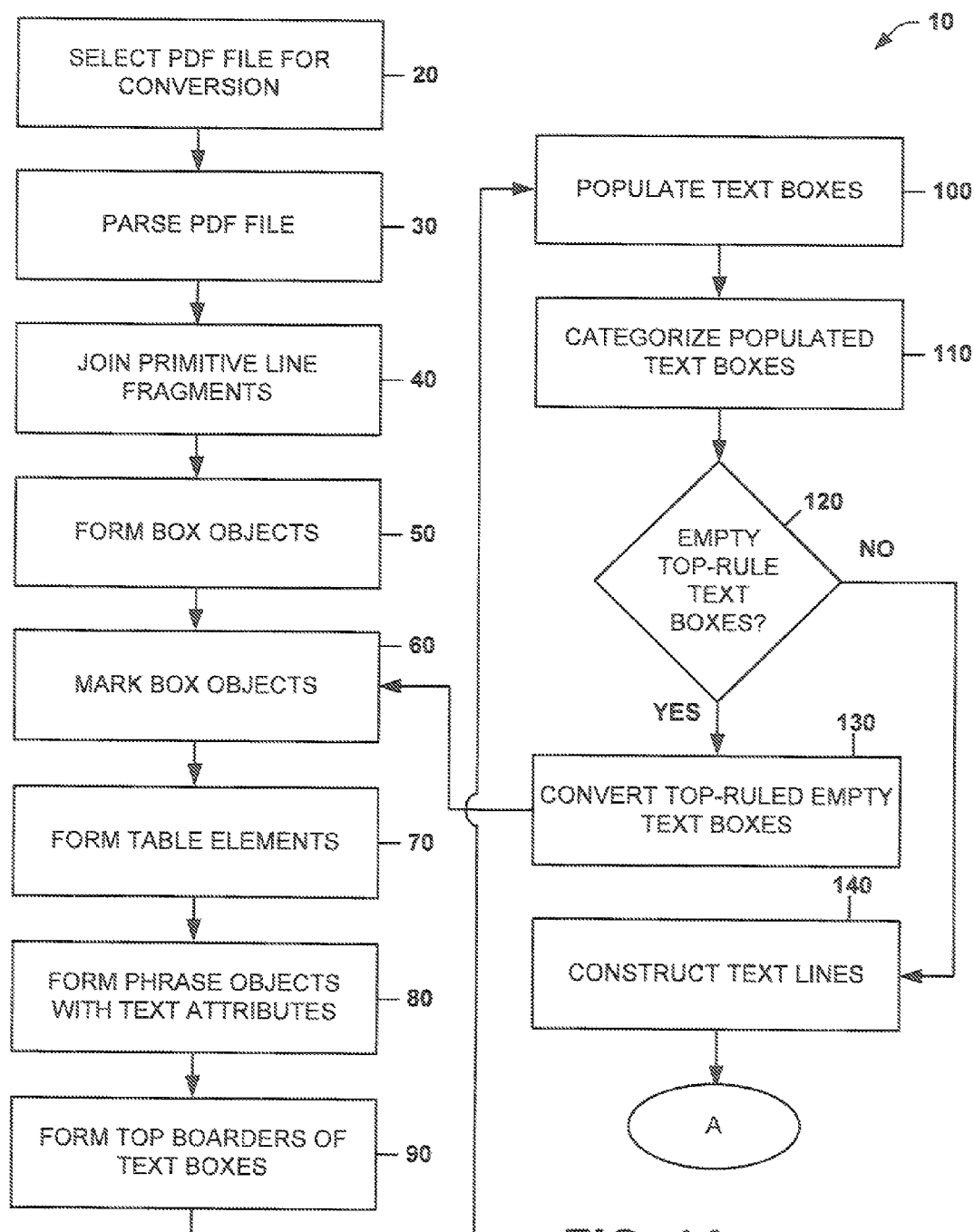
FIGS. 1A and 1B illustrate an example of a flowchart of a method for converting a PDF file into editable design objects for a design file.
Figure 1B:
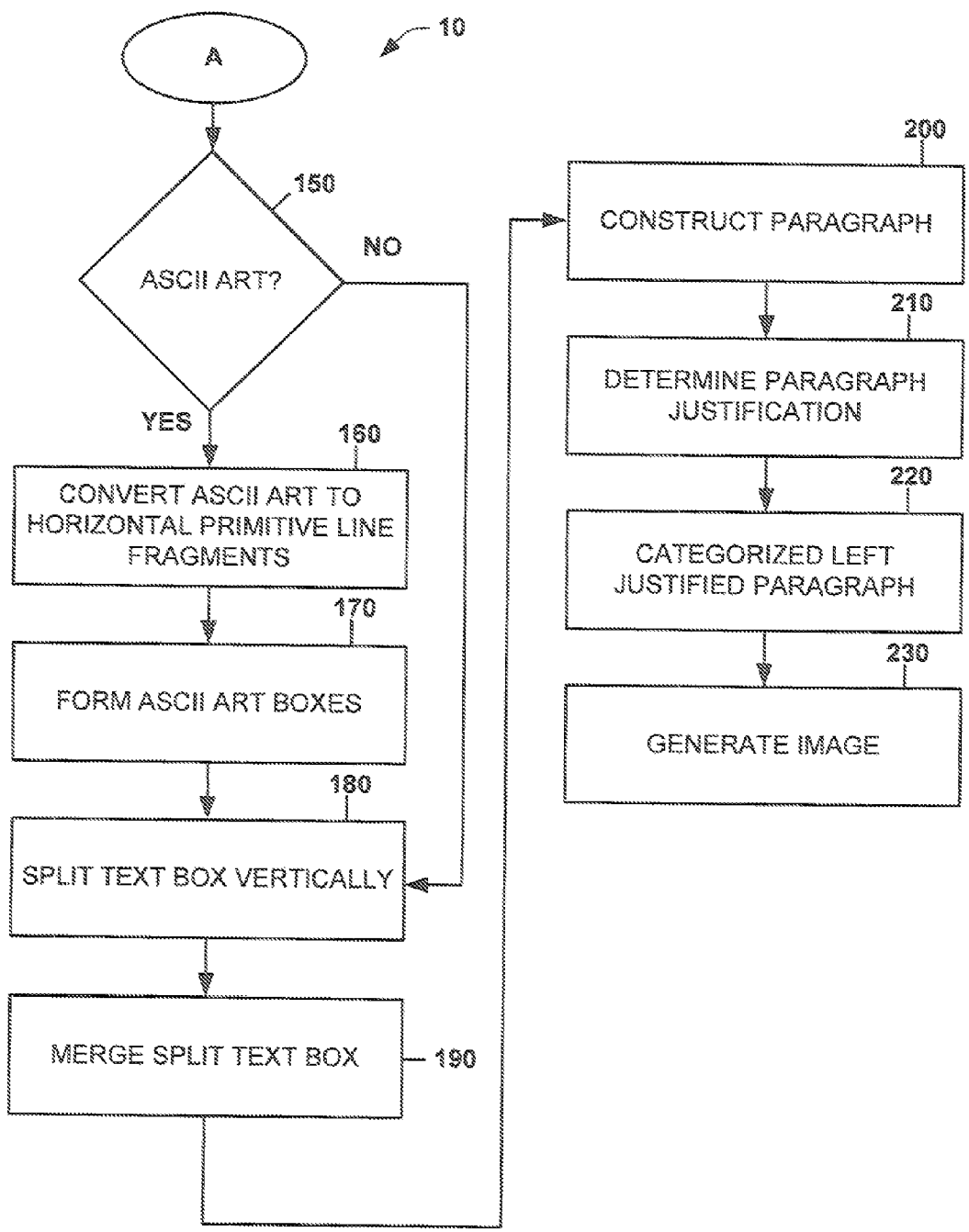

FIGS. 1A and 1B illustrate an example method 10 that can be implemented for converting a portable document format (PDF) file into editable design objects for a design file. For example, the design file can be implemented as an extensible markup language (XML) file. XML is a set of rules for encoding documents in machine-readable form, such as according a number of different XML-based languages.

The method 10 can be implemented, for example, by a computer. For instance, the method 10 can be embodied as machine readable instructions, such as software or firmware that can be executed by a processor. The method can also be stored in memory in a machine readable format. While, for purposes of simplicity of explanation, the method 10 of FIGS. 1A and 1B is shown and described as executing serially, the method 10 is not limited by the illustrated order, as some actions could in other examples occur in different orders and/or concurrently from that shown and described herein. Additionally, where the disclosure or claims recite "a," "an," "a first," or "another" element, or the equivalent thereof, it should be interpreted to include one or more than one such element, neither requiring nor excluding two or more such elements.

At 20, a PDF file is selected for conversion to the editable design objects for the design file. The PDF file could be stored, for example on a computer readable medium, such as memory (e.g., volatile or non-volatile).

At 30, the PDF file is parsed to collect primitive objects (e.g., low level objects) and graphical images present in the PDF file. The primitive objects collected can include, for example, words, boxes and line fragments. The graphical images can include, for example, pictures and polygons. The primitive objects can be collected, for example, by examining vector graphics, text elements, raster images, or the like of the PDF file. Additionally or alternatively, the primitive objects can be collected with the employment of an optical character recognition (OCR) system. It is to be understood that the collected primitive objects and any objects formed therefrom, can be employed as editable design objects for the design file. As explained herein, the primitive objects can be iteratively joined (e.g., grouped) to facilitate management and/or manipulation of the editable design objects for the design file.

At 40, collected primitive line fragments can be joined to form joined primitives (e.g., connected objects) for the design file. The joined primitives can be formed, for example, by matching end points, orientation and weights of the collected primitive line fragments. It is to be understood that "fudge factors" (e.g., proximity rules) can be employed to approximate the matching in 40. The fudge factors can be needed, for example, when collected primitive objects are not precisely aligned. Such can be the case when the PDF file originates from a scanned document, or a legacy PDF file. It is also to be understood that throughout the method 10, the aforementioned fudge factors can be employed, without further explicit mention thereof.

At 50, the joined primitives can be joined to form box objects (e.g., boxes) corresponding to design objects for the design file. The box objects can be formed, for example, by matching endpoints of respective joined primitives. In some examples, the PDF file can be implemented with the box objects as primitive objects. At 60, the box objects can be marked (e.g., labeled) as a text box or background. The marking can be based, for example, on the size and configuration of the box objects. For instance, box objects that contain no other box objects can be marked as text boxes. Additionally, box objects that are contained in other box objects and are sized at or below a certain size threshold (e.g., the size of a checkbox) can be marked as an embedded box (e.g., a checkbox), while box objects that contained other box objects sized above the size threshold can be marked as an a separate textbox, while the box object containing the separate text box, which can be referred to as an outer box, can be marked as background relative to the other objects contained therein.

At 70, table elements for the design file can be formed from a subset of the box objects marked as text boxes. For instance, primitive fragments or joined primitives that span an entire box or a portion thereof can be employed to construct elements of a table, such as rows, columns and cells. In some examples, the cells can span multiple rows and/or columns.

At 80, phrase objects with text attributes can be formed from the primitive word objects. The phrase objects can be formed, for example, by matching word objects with a common base line, font size and/or point size. Drawing patterns of certain word objects (e.g., overprinting or shifted-repeated text) of a given phrase object can be employed to assign the text attributes (e.g., bolding) for the given phrase object. Additionally, joined primitives with horizontal orientation and/or primitive line fragments not employed as table elements, which can be relatively proximal to a given phrase object; can be employed as an underline attribute for that phrase object. Other relevant features can be employed to determine other text attributes for the phrase objects.

At 90, top boarders of text boxes can be formed. The top borders of text boxes can be formed, for example, from joined primitives with horizontal orientation and/or primitive line fragments not employed as table elements or as text attributes (e.g., underlining). At 100, the text boxes can be populated by inserting a subset of the phrase objects into the text boxes. As one example, the phrases on a page can be processed in given manner (e.g., right-to-left, top-to-bottom). The results of the processing can be compared against text boxes (e.g., closed box objects or a top ruled box) identified by a different processing manner (e.g., bottom-to-top, left to right). In one example, some phrases can be fit into an enclosed box. Additionally, other phrases can be joined together and fit into an open/top ruled text box. In one example, a unique phrase can be identified and employed to generate the aforementioned open/top ruled text box, and the open/top ruled text box can configured to be resized (e.g., "grown") to accommodate other phrases that have similar qualities as the unique phrase.

At 110, the text boxes can be categorized. As one example, a text box with phrases that have been fit into an enclosed box can be categorized as a fixed text box that has a static height and static width. It is to be noted that the fudge factors can be employed in such categorization, such that phrase objects can "spill" slightly out an enclosed text box and such a text box can still be categorized as a fixed sized text box. In such an example situation, the text box can be resized. Open/top ruled text boxes that have had text inserted therein can be categorized as variable sized text boxes, wherein the height and width of the text box can be adjusted to accommodate the further addition of phrases.

At 120, a determination is made as to whether any open/top-ruled text boxes without text exist, which text boxes can be referred to as open/top-ruled empty text boxes. If the determination is positive (e.g., YES), the method 10 proceeds to 130. At 130, the open/top-ruled empty text boxes can be converted back into individual primitive line fragments, and the method 10 returns to 60. If the determination at 120 is negative (e.g., NO), the method 10 proceeds to 140. From 130, the method also proceeds to 140.

At 140 text lines can be constructed. The text lines can be constructed, for example, by joining phrase objects that are vertically overlapping. That is, in such an example situation, text of joined phrase objects need not overlap, but a complete line height of the text of the joined phrases can overlap, thereby indicating that the joined phrase objects are positioned on the same text line. During construction of the text lines, some text lines can include text with multiple baselines. In such a situation, the baseline of a given text line can be set as the baseline with the largest number of characters in the given text line, which baseline can be referred to as a majority baseline. Baselines with less than the majority of characters can be referred to as minority baselines. Characters with a minority baseline can be implemented, for example, as superscript or subscript characters that are offset relative to the majority baseline.

At 150 a determination is made as to whether an American Standard Code for Information Interchange (ASCII) art is found in the text lines. The ASCII art can be implemented, for example, as patterned ASCII characters employed to compose an image. If the determination is positive (e.g.: YES), indicating that ASCII art is found, the method proceeds to 160. At 160, the ASCII characters of the ASCII art can be converted to horizontal primitive line fragments. At 170, an ASCII art box can be formed. The ASCII art box can be formed, for example by joining the horizontal primitive line fragments of the ASCII characters of the ASCII art by matching endpoints, orientation and rule weights to form joined ASCII art fragments in a manner similar to actions performed at 40. Additionally or alternatively, the joined ASCII art fragments can be joined by matching endpoints of the ASCII art fragments to form the ASCII art box in a manner similar to actions performed at 50, such that the ASCII art box can be rendered as an image. The method 10 can proceed to 180. Additionally, if the determination at 150 is negative (e.g., NO), the method 100 proceeds to 180.

At 180, an open or top ruled text box can be split vertically into plural (e.g., two or more) different text boxes if a given open or top ruled text box includes a vertical gutter. For instance, some PDF files converted from certain documents employed for news papers, magazines, etc., can contain multiple columns of text separated by a space, which space can be referred to as a gutter. Additionally or alternatively, a given open text box can be split vertically if a skewed outlier phrase is present in text the given open text box. An outlier phrase can be implemented as a phrase incompatible with other phrases in the given text box with respect to positioning, spacing, etc. For instance, if the given open text box contains a first phrase and a second phrase separated by lines, wherein the first and second phrases are left justified to the same margin, and a third phrase is justified to a different margin, the third phrase could be considered an outlier phrase. In such a situation, the given text box can be split into two different text boxes, one containing the first and second phrases, another containing the outlier phrase.

At 190 a text box that has been vertically split (e.g., at 180) can be merged with an adjacent text box. For instance, a given text box generated from the result of a vertical split can merged with a text box positioned below the given text box. The merging can be performed in a manner similar to the action described in 140.

At 200, a paragraph can be constructed. The paragraph can be formed, for example, by scanning lines backwards to identify a last line in the paragraph. The last line can be identified, for example, by identifying a significant difference in spacing as compared to other lines of text in the paragraph. Additionally, the lines can be scanned forward, and each line can be marked as compatible (e.g., a text line in the same paragraph) or incompatible (e.g., a text line in a different paragraph) with a pervious line. The compatibility can be based, for example, on spacing, tabbing, and justification of each text line relative to the previous text line. The results of the backward scanning and forward scanning can be compared and reconciled to determine the boundaries for the constructed paragraph.

At 210, the constructed paragraph's justification is determined. The justification can be based on a frequency of distribution of spacing of words and/or characters in a line of the constructed paragraph. For instance, a broad distribution of spacing can indicate that the constructed paragraph is justified (e.g., flush with left and right margins). A narrow distribution of spacing can indicate that the constructed paragraph has a left, right or center justification. Additionally or alternatively, the determination of the justification can be based, for example, on a position of a first and last character in each line of the constructed paragraph relative to left and right margins of the paragraph. At 220, a constructed paragraph marked as being left justified can be categorized as being an indented, bulleted, numbered or non-indented. The categorization can be based, for example, by examining a first word and/or a first character in a line and the position of the first word and/or the first character in the line.

At 230 an image, such as a bitmap image can be generated. The image can be generated from scanning the PDF file to determine an area wherein a set of primitive line fragments and/or joined primitives, referred to as polygons, in a given area exceed a threshold number and the polygons have not been assigned to another object. The area can be marked as a polygon cell, and that polygon cell, as well as any adjoining polygon cells can be converted into an image. Thus, a drawing in the PDF file made of a large number (e.g., a dozen or more) of primitive line fragments can be converted into a single image design object. As an example, the drawing in the PDF file can be implemented as a picture, a logo, etc.

Figure 2:
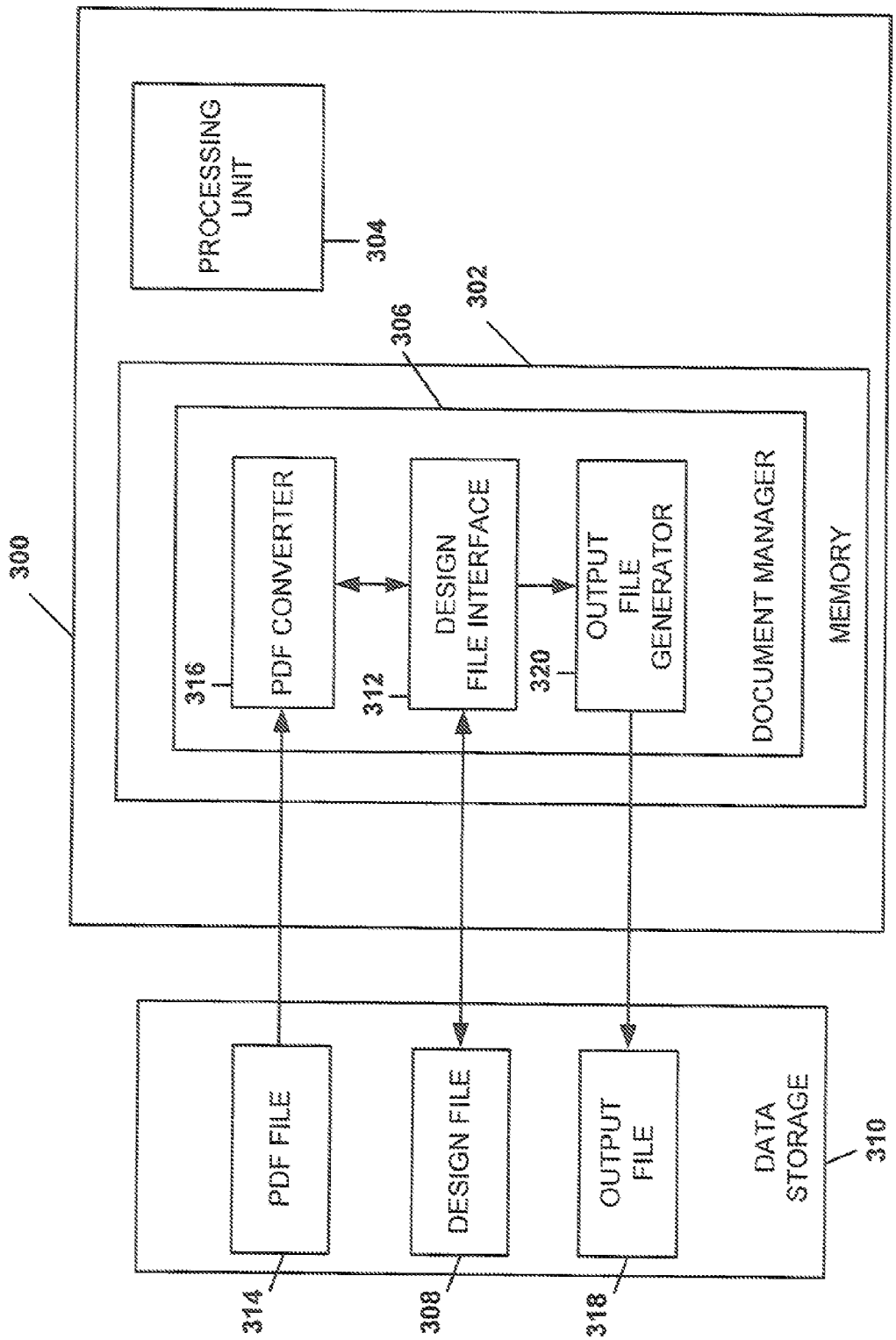
FIG. 2 illustrates an example of a computer system for managing a document.

FIG. 2 illustrates an example of a computer system 300 for managing a document. The computer system 300 can include a memory 302 for storing machine readable instructions. The memory 302 can be implemented, for example, as volatile or non-volatile random access memory (RAM), programmable logic, or the like. The computer system 300 can also include a processing unit 304 that can access the memory 302 and executes the machine readable instructions. The processing unit 304 can be implemented, for example, as a processing core.

By way of example, the machine readable instructions can include a document manager 306 that can be employed to generate and manipulate a design file 308, such as an XML file. The design file 308 can be stored, for example, in a data storage 310, which data storage 310 could be implemented as a computer readable medium, such as a hard disk, a hard disk array, a solid state drive, etc. In the example of FIG. 2, the data storage 310 is illustrated as being a separate structure from the computer system 300. However, one of ordinary skill in the art will understand and appreciate that in some examples the data storage 310 can be integrated with the computer system 300. The design file 308 can be implemented as a specific species of XML file, such as a dialogue exchange format (DXF) file. One of ordinary skill in the art will understand and appreciate other file formats that could be generated and/or manipulated by the document manager 306.

As a further example, the design file 308 can be employed as a template to generate documents, such as fillable forms, periodical articles, interactive documents (e.g., web pages) or other types of documents. One of ordinary skill in the art will understand and appreciate the various uses for the design file 308. In one example, the document manager 306 can include a design file interface 312 to provide a graphical user interface (GUI) to a user for manipulating and/or generating the design file 308. The GUI can provide a mechanism for adding objects to or removing objects from the design file 308. The objects can include, for example, fixed sized text boxes, variable sized text boxes, readable text, images, or the like. The objects can be manipulated via the GUI.

Additionally, the design file interface 312 (e.g., via the GUI) can provide an interface to initiate importation of objects from a PDF file 314 from the data storage 310 into the design file 308. As an example, the design file interface 312 can employ a PDF converter 316 to convert the PDF file 314 into editable design objects in a format compatible with the design file 308 (e.g., an XML or DXF file). In such an example, the PDF converter 316 can convert the PDF file 314 into a plurality of primitive objects and iteratively join the plurality of primitive objects to form the editable design objects for the design file 308. The objects originating from the PDF file 314 can be made available to the design file interface 312 such that the user of the computer system 300 can manipulate the objects originating from the PDF file 314 in a manner similar to the objects natively created for the design file 308 without requiring a manual selection of PDF primitive objects for importation. To convert the PDF file into objects in the format compatible with the design file 308, the PDF converter 316 can employ, for example, the method 10 shown and described with respect to FIGS. 1A and 1B (e.g., stored in the memory 302 as machine readable instructions).

Upon manipulation and/or generation of the design file 308, the user may desire to provide an output file 318 in a different format than the format of the design file 308. For instance, in some examples, the user may desire to convert the design file 308 into a PDF file 314, such as a fillable form or a text document. Appropriate interfaces and converters thus can be utilized to provide various file formats that the user may desire to output. In such a situation, the design file interface 312 can provide the design file 308 to an output file generator 320 that can convert the design file 308 into a desired format, thereby generating the output file 318. The output file 318 can be stored, for example, in the data storage 310 as illustrated. Alternatively or additionally, the output file can be stored in the memory 302.

The document manager 306 can be employed in a variety of environments. As an example, the document manager 306 can be employed to generate a billing statement for a plurality of different customers. In such example, the PDF file 314 could be implemented as an uneditable generic billing statement that includes many different sections, some of which are not applicable to certain customers. Thus, the document manager 306 can be employed to generate a design file 308 that can import editable design objects corresponding to the generic billing statement and generate an editable billing statement (e.g., as the output file 318) tailored for a specific customer.

Figure 3:
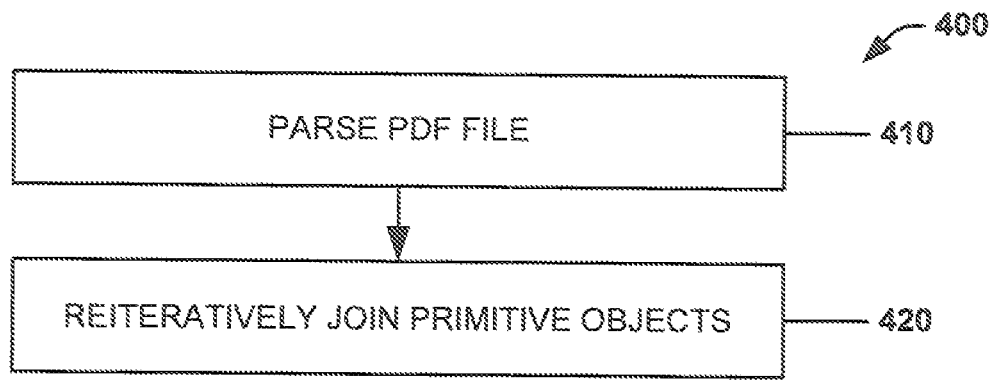
FIG. 3 illustrates another example of a flowchart of a method for converting a PDF file to design objects for a design file.
Figure 4:
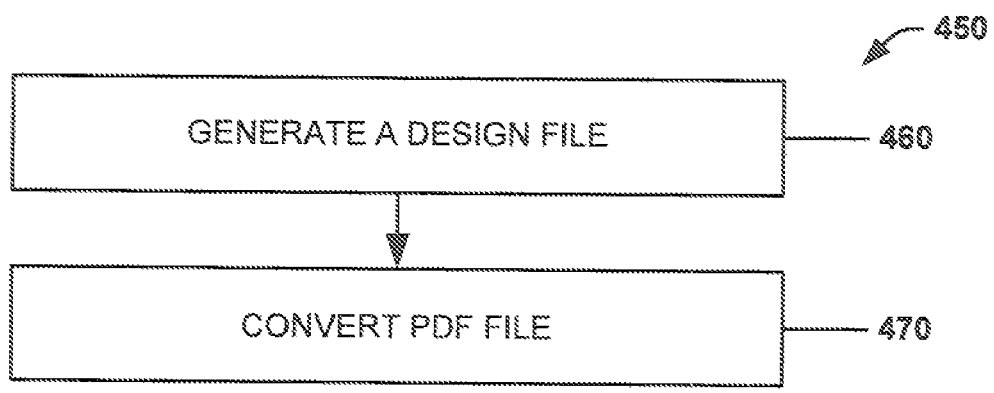
FIG. 4 illustrates an example of a flowchart of a method for managing a document.

In view of the foregoing structural and functional features described above, example methods will be better appreciated with reference to FIGS. 3-4. As with the method 10 illustrated in FIGS. 1A and 1B, for purposes of simplicity of explanation, while the examples methods of FIGS. 3-4 are shown and described as executing serially, the methods are not limited by the illustrated order, as some actions could in other examples occur in different orders and/or concurrently from that shown and described with respect to FIGS. 3-4.

FIG. 3 illustrates a flow chart of an example method 400 for converting a PDF file into editable design objects. At 410, a PDF file can be parsed to collect a plurality of primitive objects. At 420, a subset of the plurality of primitive objects can be iteratively joined to form editable design objects for a corresponding design file.

FIG. 4 illustrates a flow chart of a method 450 for managing a document. At 460, a design file can be generated. At 470, a PDF file can be converted into editable design objects for the design file. The editable design objects can be generated based on joining primitive objects of the PDF file.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A method for converting a portable document format (PDF) file into editable design objects comprising:

parsing a PDF file to identify a plurality of primitive objects; and iteratively joining a subset of the plurality of primitive objects to form the editable design objects for a corresponding design file, wherein the editable design objects are editable by a design file interface of the design file, wherein a fudge factor is employed to join two primitive objects of the subset of the plurality of primitive objects to form a box object defined by a boundary;

inserting the remaining primitive objects of the subset of the plurality of joined primitive objects into the box object, wherein endpoints of the plurality of joined primitive objects are outside the boundary of the box object, remaining portions of the plurality of joined primitive objects are within the boundary of the box object; and resizing the boundary of the box object such that the endpoints of the plurality of joined primitive objects are inside the boundary of the box object.

2. The method of claim 1, wherein the design file comprises an extensible markup language (XML) file.

3. The method of claim 1, wherein the design file comprises a dialogue exchange format (DXF) file.

4. The method of claim 1, wherein the subset of the plurality of primitive objects is a first subset of the plurality of primitive objects, the method further comprising:
   joining a second subset of the plurality of primitive objects, wherein the first and second subsets of the plurality of primitive objects are different subsets of the plurality of primitive objects; and
   forming an image file from the second subset of the plurality of primitive objects.

5. The method of claim 1, wherein one of the editable design objects comprises an open or top ruled text box containing a gutter, the method further comprises:
   vertically splitting the open or top ruled text box to form plural text boxes; and
   merging a given one of the plural text boxes with another text box, wherein the another text box is positioned below the given one of the plural text boxes.

6. The method of claim 1, wherein the iteratively joining further comprises:
   joining primitive line fragments of the plurality of primitive objects by matching at least one of endpoints, orientation and weights of the primitive line fragments of the plurality of primitive objects to form plural joined primitives; and
   forming another box object by matching endpoints of the plural joined primitives.

7. The method of claim 6, further comprising constructing a table element from the other box object.

8. The method of claim 1, wherein one of the editable design objects comprises a paragraph, the method further comprising determining a justification of the paragraph based on a frequency of distribution of at least one of words and characters in the paragraph.

9. A document management system comprising:
   a memory for storing machine readable instructions; and
   a processing unit for accessing the memory and executing the machine readable instructions, the machine readable instructions comprising:
      a portable document format (PDF) converter to:
         convert a PDF file stored in data storage into editable design objects by converting the PDF file into a plurality of primitive objects and iteratively joining the plurality of primitive objects to form the editable design objects for a corresponding design file, wherein a fudge factor is employed to join two primitive objects of the plurality of primitive objects to form a box object defined by a boundary;
         insert a subset of the plurality of joined primitive objects into the box object, wherein the endpoints of the plurality of joined primitive objects are outside the boundary of the box object, remaining portions of the plurality of joined primitive objects are within the boundary of the box object; and
         resize the boundary of the box object such that the endpoints of the plurality of joined primitive objects are inside the boundary of the box object; and a design interface to provide a graphical user interface for importing the editable design objects into the design file.

10. The document management system of claim 9, wherein the PDF file is a first PDF file, the system further comprising an output file generator to generate an output file based on the design file, wherein the output file is a second PDF file.

11. The document management system of claim 9, wherein the PDF converter forms a text box containing text.

12. A non-transitory computer readable medium having computer readable instructions comprising:
   a document manager to provide a design file; and
   a portable document format (PDF) converter to:
      convert a PDF file into editable design objects for the design file, wherein the editable design objects are generated based on joining primitive objects of the PDF file, wherein one of the editable design objects comprises a text box;
      insert a subset of the plurality of joined primitive objects into the text box, wherein endpoints of the plurality of joined primitive objects are outside the boundary of the text box, and remaining portions of the plurality of joined primitive objects are within the boundary of the text box; and
      resize the boundary of the text box such that the endpoints of the plurality of joined primitive objects are inside the boundary of the text box; and
      categorize the text box as a variable sized text box, wherein each of the height and width of the variable text box vary as a function of an amount of text added to or removed from the variable sized text box in response to user input, wherein the document manager comprises a design interface to provide a graphical user interface for importing the editable design objects into the design file.

13. The non-transitory computer readable medium of claim 12, wherein the PDF converter is to form a phrase object with a text attribute, primitive words of the PDF file being joined to form a phrase object based on matching at least one of a base line, font size and point size of the primitives words, a text attribute of the phrase object being assigned based on a drawing pattern of the phrase object.

14. The non-transitory computer readable medium of claim 12, wherein a text line is constructed by joining vertically overlapping phrase objects, the phrase objects comprising primitive words of the PDF file.

15. The non-transitory computer readable medium of claim 12, wherein the PDF file is a first PDF file, the system further comprising an output file generator to generate an output file based on the design file, wherein the output file is a second PDF file.

* * * * *